United States Patent [19]

Huang

[11] Patent Number: 5,571,050
[45] Date of Patent: Nov. 5, 1996

[54] TUBULAR GOLF CLUB GRIP

[76] Inventor: Ben Huang, 19472 Woodlands La., Huntington Beach, Calif. 92648

[21] Appl. No.: 527,443

[22] Filed: Sep. 13, 1995

[51] Int. Cl.[6] ............................................. A63B 49/08
[52] U.S. Cl. ........................ 473/300; 16/110 R; 273/73 J
[58] Field of Search ............................ 273/73 S, 75, 273/81 R, 81.4, 81.5, 81.6, 81 B, 67 DB; 16/110 R, 111 R, 116 R; 473/300, 303

[56] References Cited

U.S. PATENT DOCUMENTS

| | | |
|---|---|---|
| 612,057 | 10/1898 | Richter .................................. 273/81 B |
| 1,441,986 | 1/1923 | Lard . |
| 1,968,064 | 7/1934 | Young . |
| 2,050,176 | 8/1936 | Hammerich . |
| 2,133,695 | 10/1938 | Hall ...................................... 273/81 R |
| 2,177,143 | 10/1939 | Lamkin . |
| 2,200,626 | 5/1940 | Lamkin . |
| 2,772,090 | 11/1956 | Brandon . |
| 3,078,097 | 2/1963 | Mitchell . |
| 3,271,031 | 9/1966 | Mitchell . |
| 3,860,469 | 1/1975 | Gregorian et al. ................... 273/81 R |
| 4,373,718 | 2/1983 | Schmidt . |
| 4,819,939 | 4/1989 | Kobayashi ........................... 273/81 R |
| 5,234,740 | 8/1993 | Reeves et al. . |
| 5,397,123 | 3/1995 | Huang . |

*Primary Examiner*—William M. Pierce
*Attorney, Agent, or Firm*—Fulwider Patton Lee & Utecht, LLP

[57] ABSTRACT

A tubular grip for a golf club shaft defined by a resilient sleeve over the exterior of which is vulcanized a thin felt layer. A polyurethane layer is then bonded over the felt layer to define an integral completed grip which is slipped over and adhered to the golf club shaft.

8 Claims, 10 Drawing Sheets

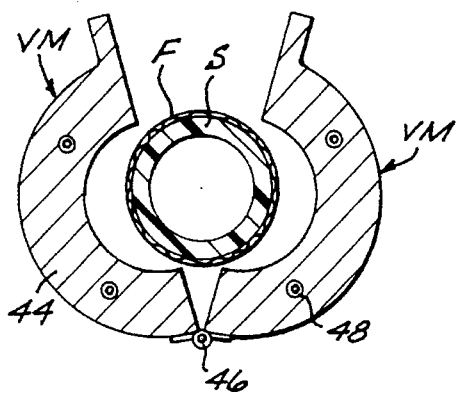
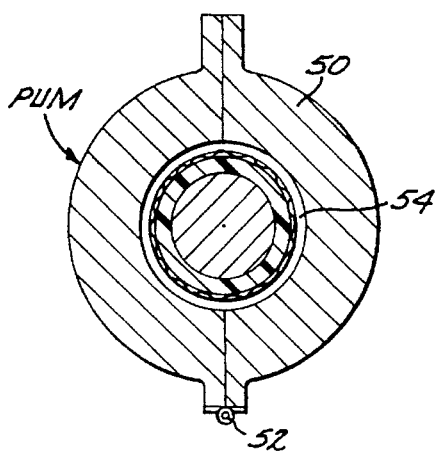
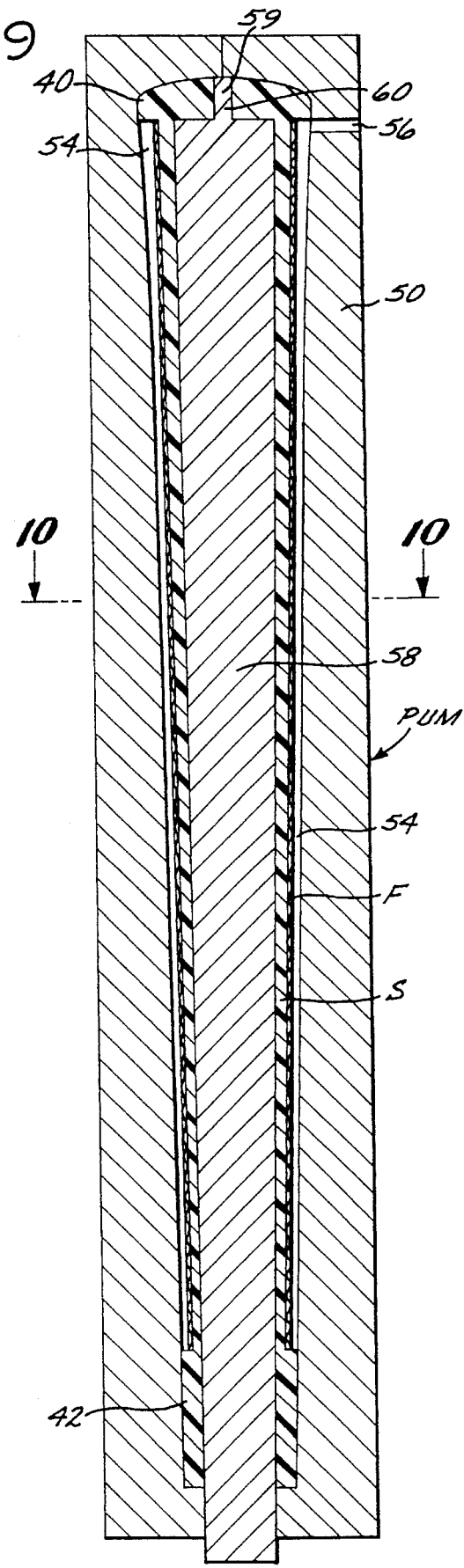

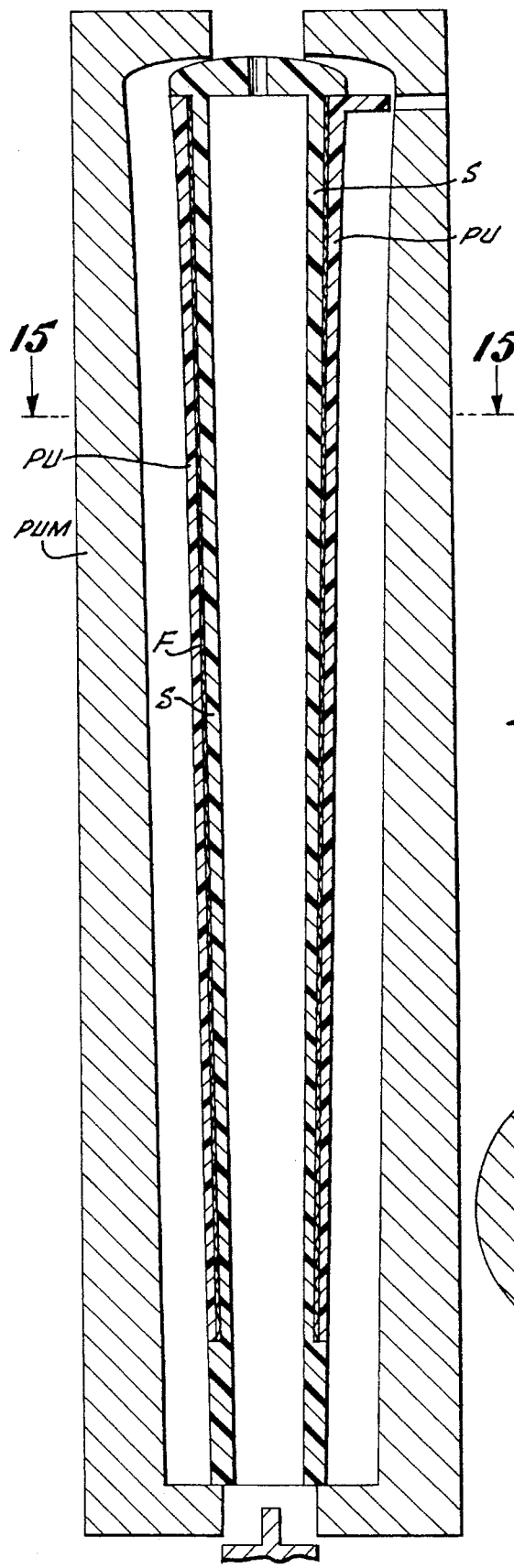
FIG. 14
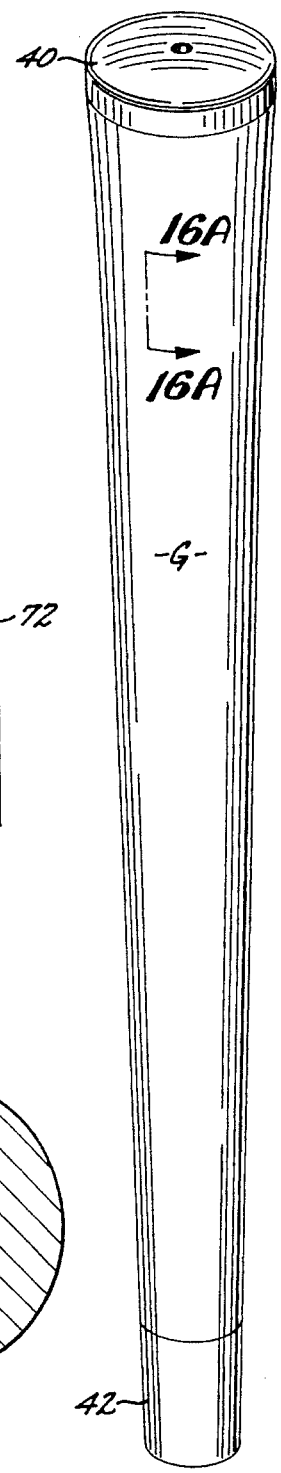
FIG. 16
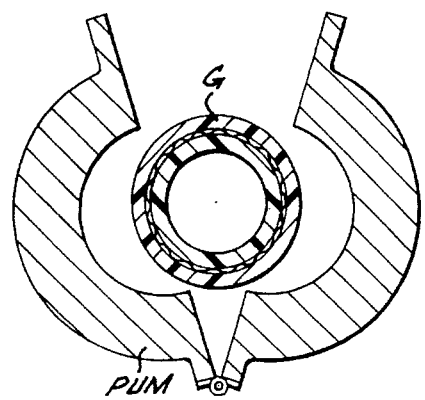
FIG. 16A
FIG. 15

FIG. 20
FIG. 22
FIG. 21
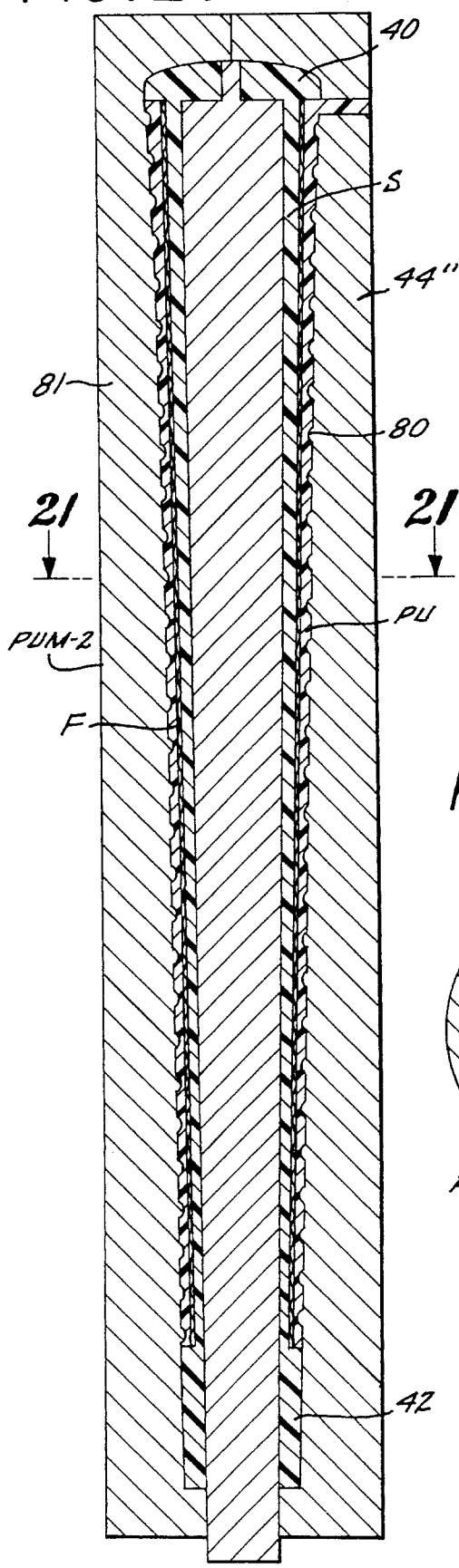
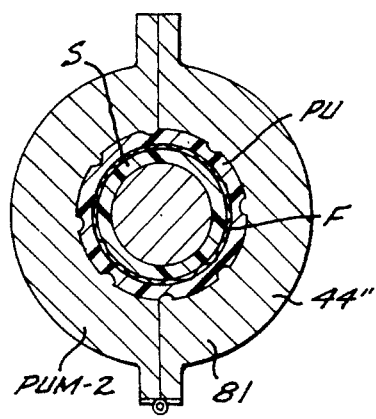
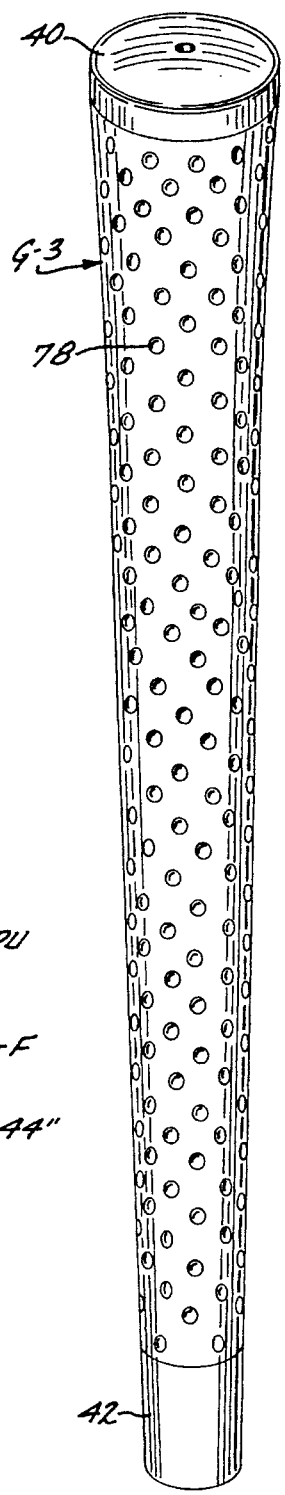

FIG.23
FIG.25
FIG.24
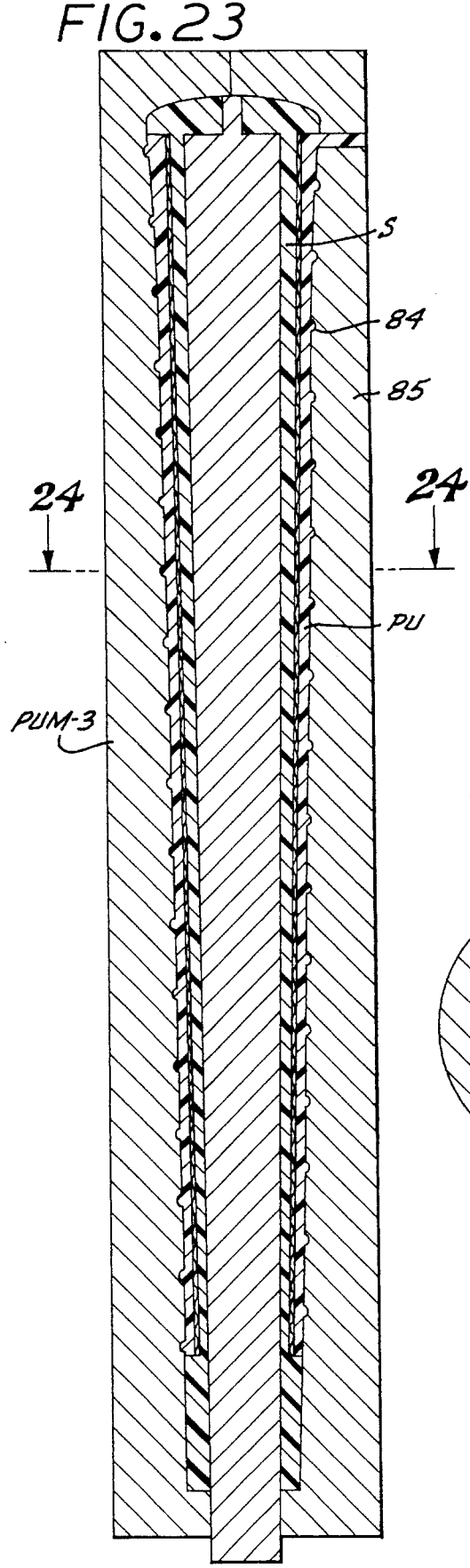
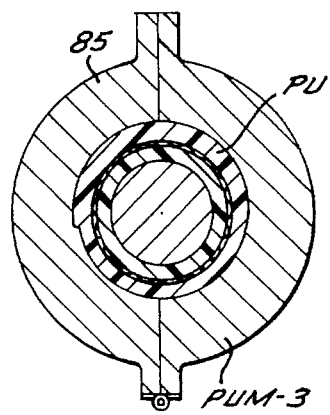
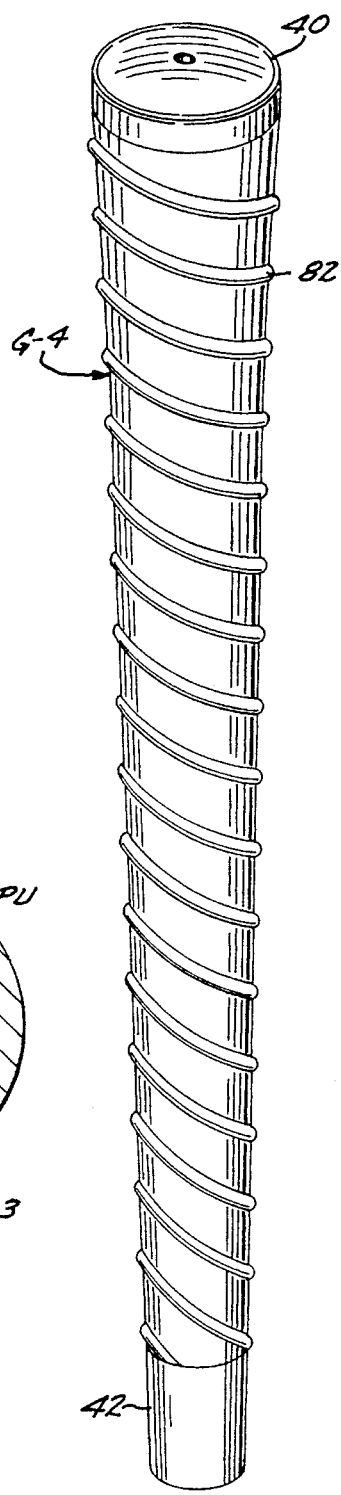

FIG. 29
FIG. 31
FIG. 30
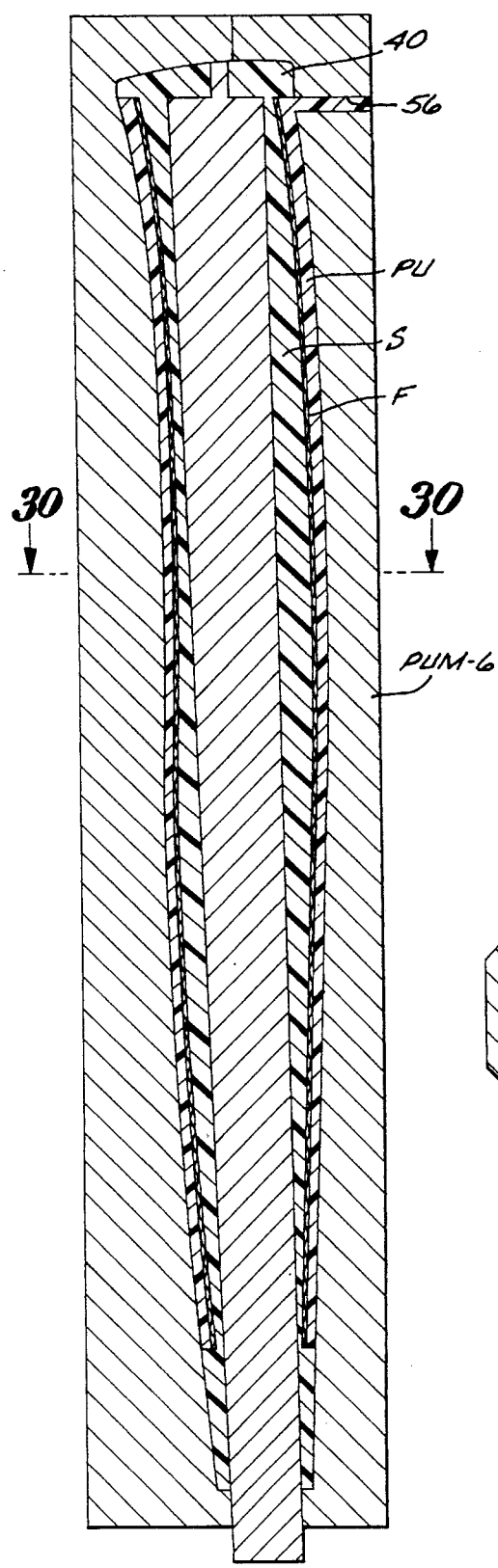
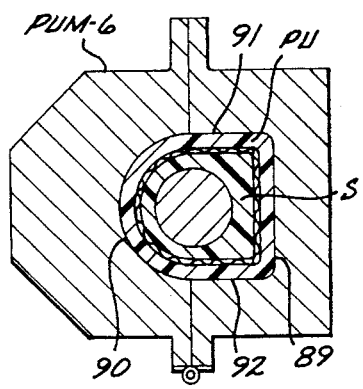
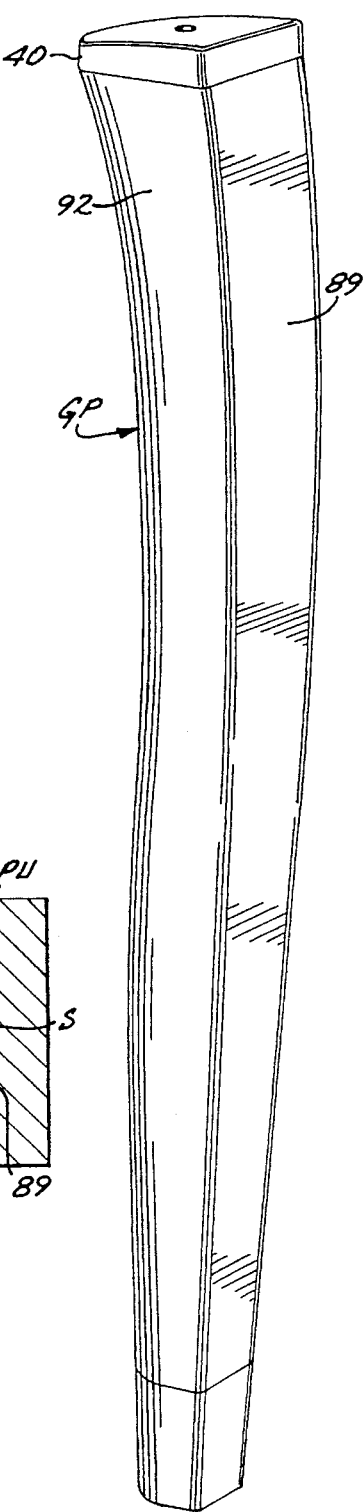

TUBULAR GOLF CLUB GRIP

BACKGROUND OF THE INVENTION

1. Field of the Invention

The present invention relates to an improved golf club grip which may also be utilized with other devices employing shafts or handles.

2. Description of the Prior Art

Conventional golf club grips are molded from a single piece of rubber or synthetic plastic. A serious disadvantage of conventional golf club grips is their tendency to become slippery when dampened, as for example, when playing under rainy conditions or by contact with perspiration formed on the golfer's hands. Slippery contact of a golfer's hands with a golf club grip reduces his feel of the golf club. Most conventional golf club grips are formed with a longitudinal profile having constant straight slope or taper extending downwardly from the top of the golf club shaft toward the head of the club. This constant straight slope or taper, however, does not provide the optimum control of the club for all golfers. It is therefore desirable to be able to vary the longitudinal profile of a golf club grip to meet the desires of any particular golfer, i.e., a person with small hands usually obtains better results with a grip of reduced diameter as compared to a person with large hands. It is also desirable to be able to vary the horizontal profile of the grip of a putter to provide better feel of such club.

In order to overcome the above-described disadvantages of conventional golf club grips, I have previously developed a golf club grip utilizing an elongated resilient strip comprising a layer of a textile such as felt bonded to a layer of polyurethane. The felt layer is adhered to and provides strength to the polyurethane layer. The polyurethane layer is of closed pore construction which provides a cushioned grip and enhances tackiness to the golfers hand. The felt and polyurethane strip is spirally wrapped about a resilient rubber-like sleeve which is slipped over and adhered to the grip-receiving upper portion of a golf club shaft. Such sleeve may vary in profile along its longitudinal axis so that when the strip is wrapped about the sleeve the longitudinal profile of the grip may, if desired, conform to a desired configuration different than the longitudinal profile of the original conventional grip and golf club shaft. My heretofore proposed golf club grip may either be applied to a golf club shaft by a golf club manufacturer or by a golfer. When the grip is applied by a golfer, the sleeve is first adhered to the golf club shaft and thereafter the elongated strip is wrapped about such sleeve. When such golf club grip is fabricated by a manufacturer, the manufacturer wraps the longitudinal strip around the sleeve to form a completed grip. The complete grip is then adhered to the grip-receiving portion of a golf club shaft.

SUMMARY OF THE INVENTION

The golf club grip of the present invention eliminates the labor required to wrap an elongated felt-polyurethane strip around a resilient rubber-like sleeve. Instead, a felt-polyurethane layer is bonded onto the exterior of a resilient sleeve by the golf club grip manufacturer to define a complete, integral grip. It is more efficient and economical to produce such grip, as compared to my heretofore proposed grip, since such new grip eliminates steps such as cutting, skiving, and heat stamping exterior slip-inhibiting patterns on the polyurethane layer of the strip. Instead, the felt-polyurethane component of the grip is integrally bonded to the resilient sleeve, thereby eliminating the need for the manufacturer to spirally wrap the felt-polyurethane strip around the resilient sleeve. The golf club grip of the present invention also eliminates the production cost of a completed golf club since the golf club manufacturer can directly adhere the integral golf club grip to the golf club shaft at the factory. Additionally, a golf club grip made in accordance with the present invention can be of lighter weight than my earlier spirally wrapped-strip type grip because the felt component of the felt-polyurethane layer can be thinner, and therefore, lighter in weight than the felt component utilized in my spirally wrapped strip grip. Accordingly, more weight can be distributed to the club head, thereby increasing club head speed without increasing the weight of the golf club.

Other features and advantages of the present invention will become apparent from the following detailed description, taken in conjunction with the accompanying drawings which illustrate by way of example the features of the present invention.

BRIEF DESCRIPTION OF THE DRAWINGS

FIG. 8 is horizontal sectional view taken along line 8—8 of FIG. 6.

FIG. 9 is a central vertical sectional view showing a polyurethane receiving mold utilized in forming a preferred form of grip embodying the present invention.

FIG. 10 is a horizontal sectional view taken along line 10—10 of FIG. 9.

FIG. 14 is a view similar to FIG. 17 showing how the mold of FIG. 17 is opened to permit removal of the golf club grip.

FIG. 15 is a horizontal sectional view taken along line 15—15 of FIG. 14.

FIG. 16 is a perspective view showing a completed golf club grip made in accordance with the present invention.

FIG. 16A is an enlarged vertical sectional view taken along line 16A—16A of FIG. 16.

FIG. 20 is a central vertical sectional view showing a polyurethane receiving mold utilized to form a golf club grip wherein the polyurethane layer is formed with dimples rather than perforations.

FIG. 21 is a horizontal sectional view taken along line 21—21 of FIG. 20. FIG. 22 is a perspective view showing a golf club grip made with the mold of FIGS. 20 and 21.

FIG. 23 is a central vertical sectional view of a polyurethane receiving mold utilized to form a golf club grip wherein the polyurethane layer is formed with spiral protrusions.

FIG. 24 is a horizontal sectional view taken along line 24—24 of FIG. 23.

FIG. 25 is a perspective view showing a golf club grip made with the mold of FIGS. 23 and 24.

FIG. 29 is a central vertical sectional view of a polyurethane receiving mold utilized to form a putter grip in accordance with the present invention.

FIG. 30 is horizontal sectional view taken along line 30—30 of FIG. 29.

FIG. 31 is a perspective view of a putter grip made with the mold of FIGS. 29 and 30.

DETAILED DESCRIPTION

Figure 1:
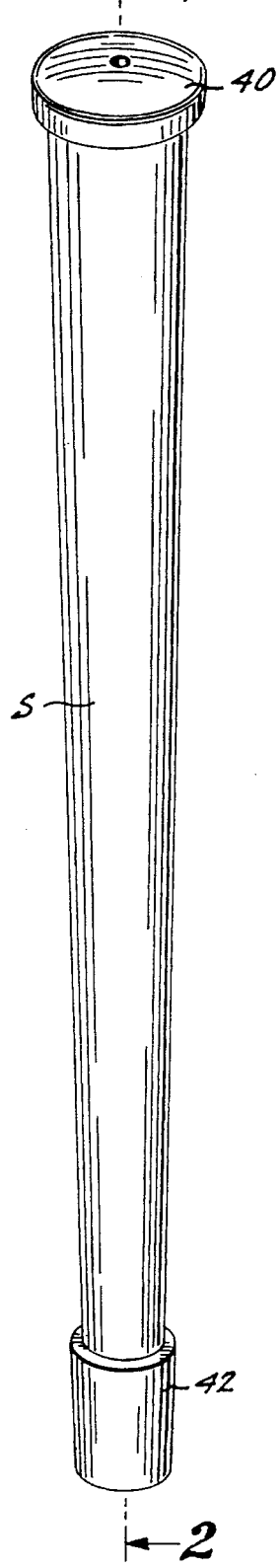
FIG. 1 is a perspective view showing a resilient sleeve component of the golf club grip of the present invention.

Referring to the drawings, FIGS. 1–15 show the steps employed in forming a preferred form of golf club grip G embodying the present invention which is applied to the upper grip-receiving portion of golf club shaft (not shown). Grip G includes a resilient rubber-like sleeve S over which is vulcanized an open-pored material, such as a thin felt layer F. A polyurethane layer PU is thereafter bonded to the exterior of the felt layer F to define the golf club grip G of FIG. 16.

Figure 2:
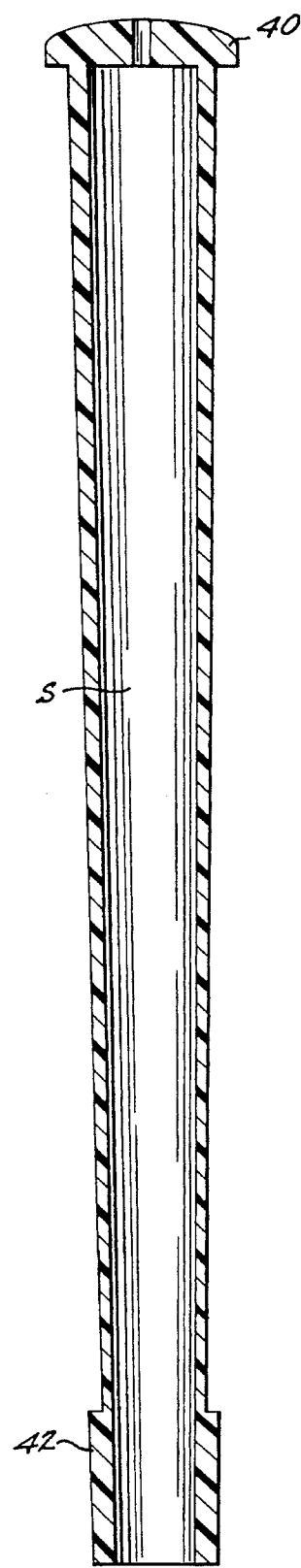
FIG. 2 is a vertical central sectional view of the sleeve taken in enlarged scale along line 2—2 of FIG. 1.
Figure 3:
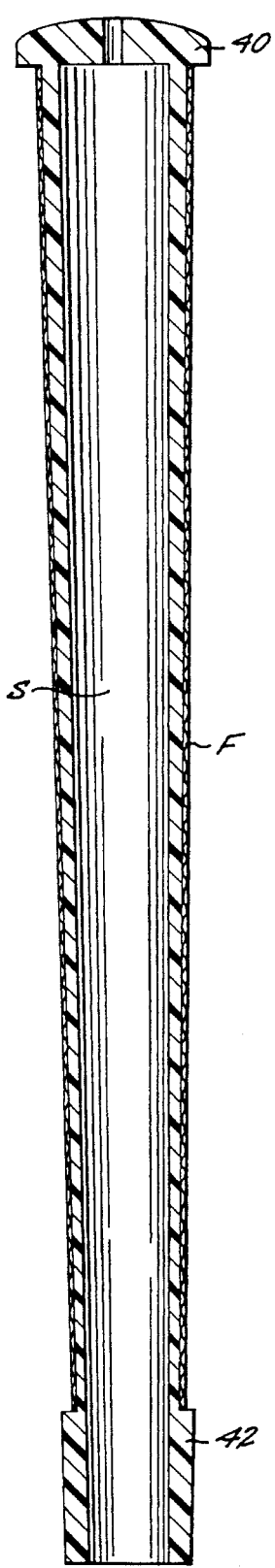
FIG. 3 is a view similar to FIG. 2 showing a layer of felt applied to the exterior of the resilient sleeve.
Figure 4:
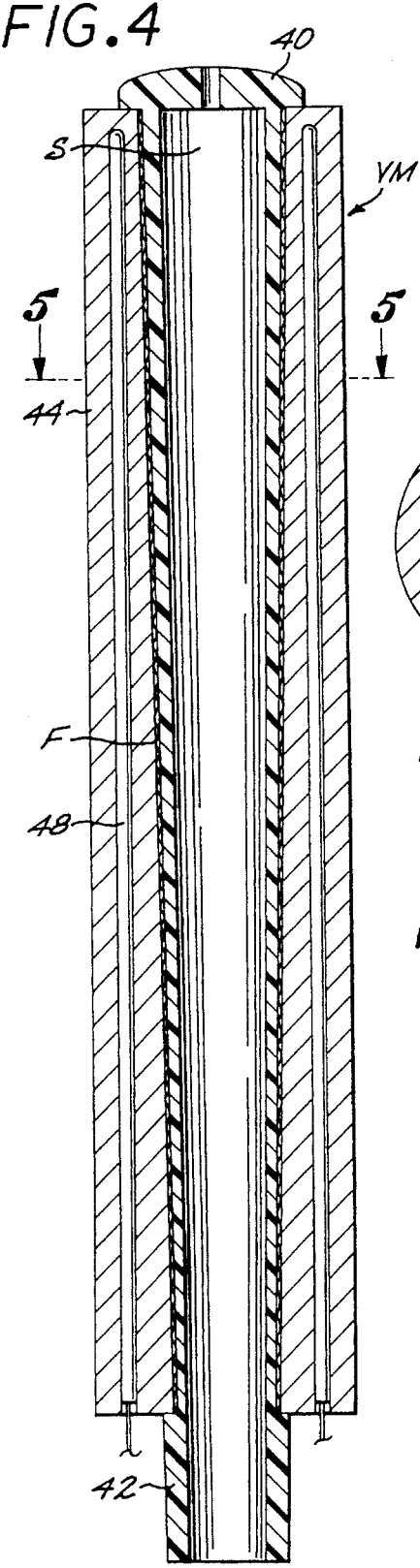
FIG. 4 is a central vertical sectional view showing a vulcanizing mold utilized to bond the felt layer to the resilient sleeve.
Figure 5:
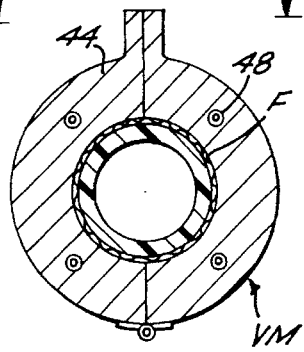
FIG. 5 is a horizontal sectional view taken along line 5—5 of FIG. 4.
Figure 7:
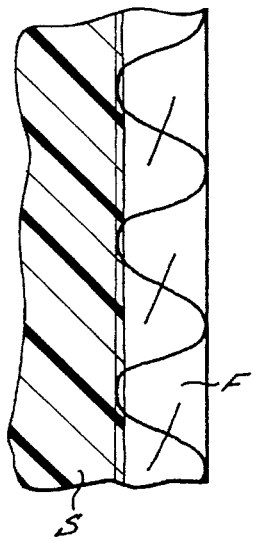
FIG. 7 is an enlarged view of the encircled area designated 7 in FIG. 6.
Figure 6:
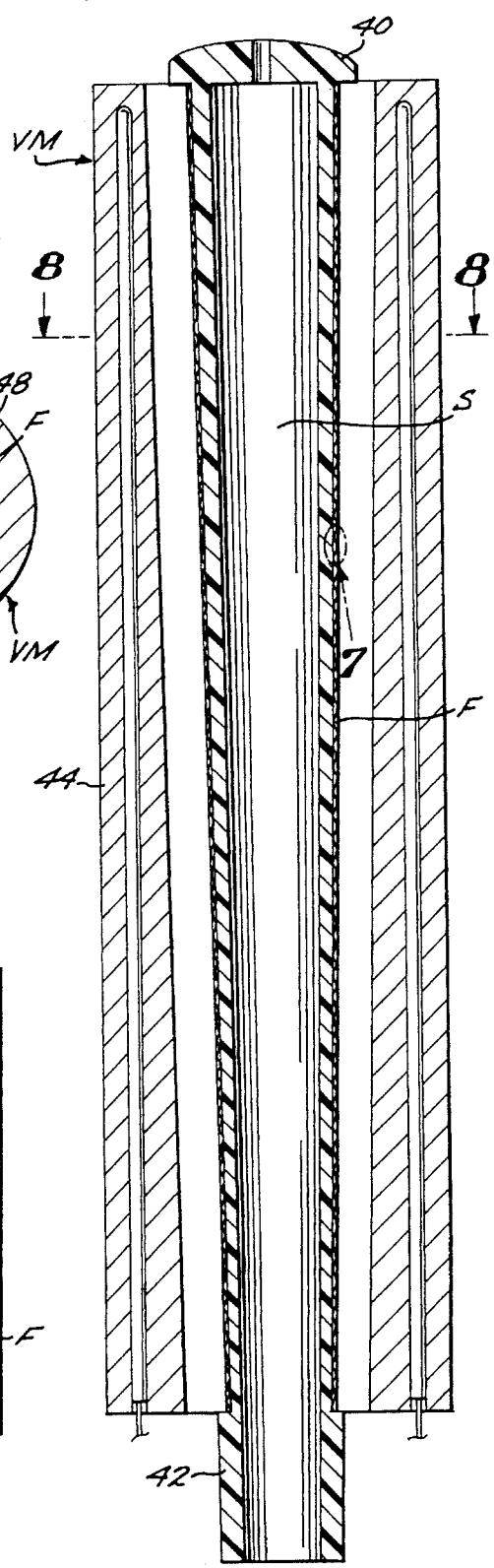
FIG. 6 is a view similar to FIG. 4 showing the vulcanizing mold of FIG. 4 in its open position.

More particularly, with reference to FIGS. 1, 2 and 3, sleeve S may be of unitary synthetic plastic foam or rubber construction utilizing an intregal cap 40. The lower portion of the sleeve is formed with a guide cylinder 42. The inner diameter of the sleeve S should be so selected as to effect a snug grip with the grip-receiving portion of a golf club shaft when the sleeve is applied to such shaft. The felt layer F should be comparatively thin having a thickness of about 0.1–1.0 mm. A split-type vulcanizing mold of convention construction VM shown in FIGS. 4 and 5 is utilized to bond the felt layer F to the exterior of the sleeve S between cap 40 and guide cylinder 42. The vulcanizing mold VM includes a two-piece housing 44 having hinges 46 along one side thereof. A plurality of conventional electric resistance heating elements 48 extend vertically through the two halves of housing 44. These heating elements 48 apply sufficient heat to the felt layer F and sleeve S to vulcanize the felt to the exterior of the sleeve. As indicated in FIGS. 6 and 8, after the vulcanization step the mold VM is opened to permit removal of the sleeve S with its vulcanized felt layer F, as indicated in FIG. 7.

Figure 11:
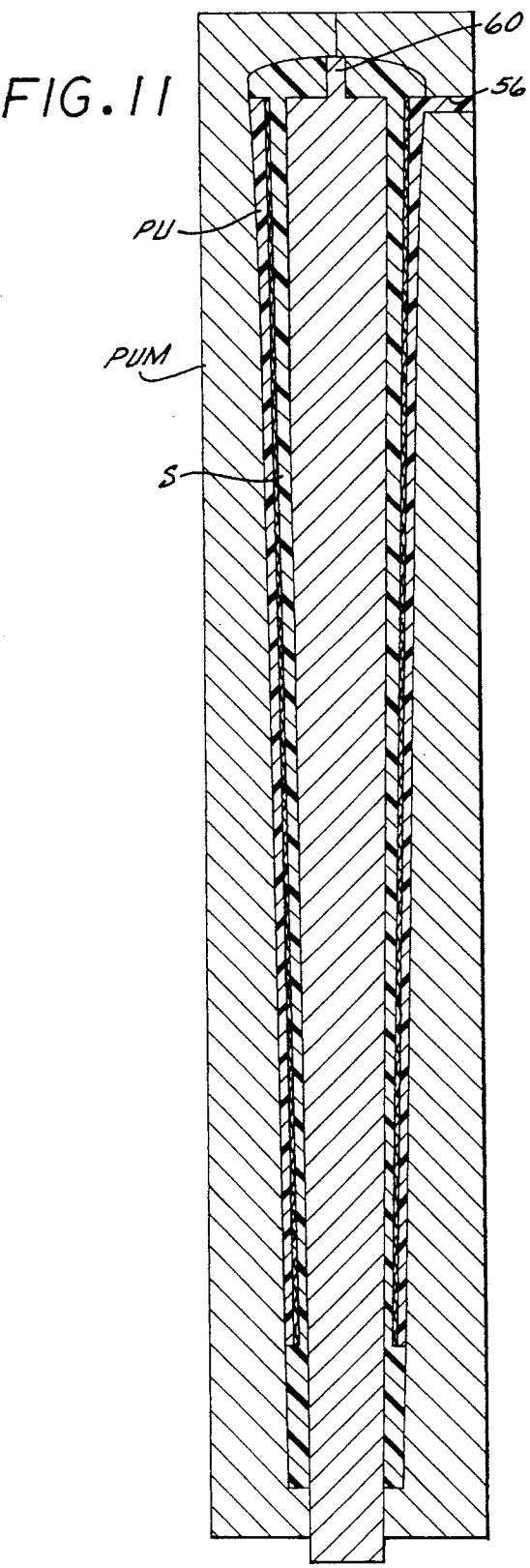
FIG. 11 is a view of the mold of FIG. 9 showing a polyurethane layer being molded to the exterior of the felt layer of the sleeve.

Referring now to FIGS. 9, 10 and 11, the sleeve S and its felt layer F is then disposed within a polyurethane receiving mold PUM for the application of the polyurethane layer PU to the exterior of the felt layer F. Mold PUM is also of conventional split construction having a two-piece housing 50 connected along one of its vertical edges by hinges 52. Mold PUM is formed with a polyurethane receiving cavity 54 which extends from the underside of the sleeve cap 40 to the upper surface of the guide cylinder 42. One side of the upper end of housing 50 is formed with a filler port 56 which extends from the exterior of the mold to the upper end of cavity 54. Mold PUM includes a fixed vertical center post 58, the upper end of which terminates at the lower edge of sleeve cap 40. A vertical pin 59 formed on the upper end of the center post 58 extends through cap 40 so as to define cap aperture 60. The function of the cap aperture is to center the upper end of the center post 58 when polyurethane is poured into mold cavity 54. Aperture 60 also permits air to escape from between the golf club shaft when the grip is applied thereover, and to permit escape of adhesive vapor applied between the exterior of the golf club shaft and the interior a grip when the grip is applied to the shaft.

Figure 12:
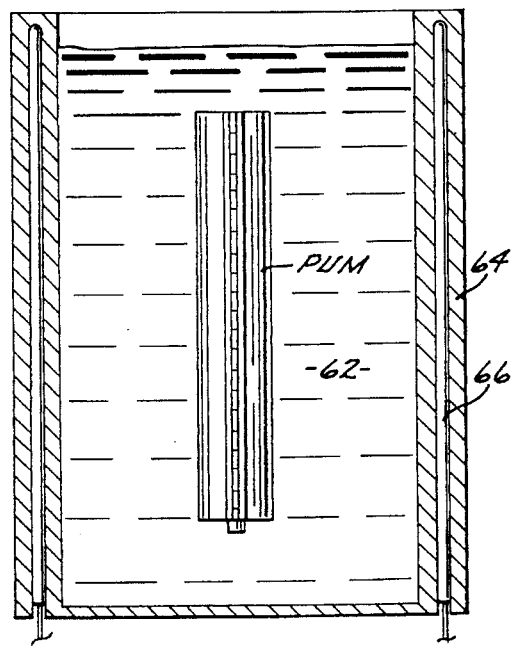
FIG. 12 is a central vertical sectional view of a coagulating water bath utilized in forming a golf club grip embodying the present invention.

In FIG. 11 polyurethane is shown after being forced through filler port 56 to fill the confines of mold cavity 54. After the polyurethane has filled cavity 54, mold PUM is immersed within a water bath 62, as indicated in FIG. 12. The water bath tank 64 includes conventional electric resistance heating elements 66 to maintain the temperature of water bath 62 between 30 to 40 degrees centigrade and thereby cause the polyurethane to coagulate.

Figure 13:
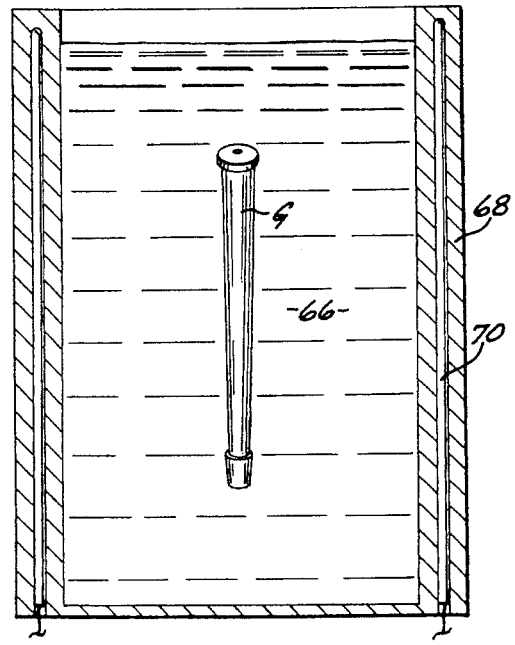
FIG. 13 is a view similar to FIG. 12 showing a second water bath utilized in displacing the dimethyl Formahide (DMF) and driving off the water utilized in forming the golf club grip embodying the present invention.

Thereafter, referring to FIGS. 14 and 15, mold PUM is opened and the golf club grip G is moved into a second water bath 66 shown in FIG. 13 to displace the dimethyl formide (DMF) and finally drive off the water therefrom. Tank 68 which contains second water bath 66 is provided with conventional electric resistance heating elements 70 which maintain the water bath 66 at a temperature of approximately 60–70 degrees centigrade. Referring to FIG. 16A, at this time closed pores 72 have been formed in the polyurethane layer PU, the interior surface of the polyurethane layer PU, the interior surface of the polyurethane layer has been bonded to the exterior of the felt layer F and the interior of the felt layer has been vulcanized to the exterior of the resilient sleeve S to define the completed, integral golf club grip shown in FIG. 16. Closed pores 72 are seen to extend generally normal to the longitudinal axis of the sleeve SL. The completed grip is slipped over and adhered to the grip-receiving portion of a golf club shaft (not shown) either by the manufacturer of golf clubs, or by a grip replacement facility. The aforedescribed guide cylinder 42 serves to prevent buckling of the grip when the grip is slipped over the golf club shaft.

It has been found that the polyurethane layer PU provides a cushioned grasp of the player's hands on a golf club shaft and also enhances the players grip by providing increased tackiness between the players hands and the golf club grip as compared to conventional golf club grips. The provision of the closed pores 72 in the polyurethane layer enhances the golfers grip and control over a golf club because of the ready compressibility of the PU layer afforded by such closed pores.

Figure 17:
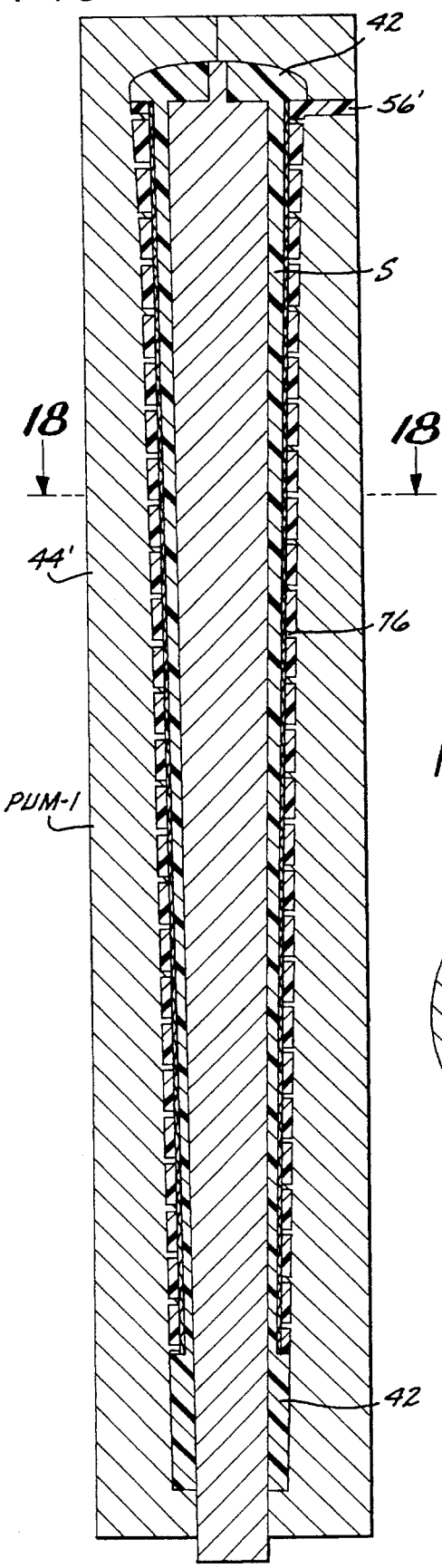
FIG. 17 is a central vertical sectional view similar to FIG. 11 of a polyurethane receiving mold utilized in forming a second form of golf club grip embodying the present invention wherein the polyurethane layer is provided with perforations.
Figure 18:
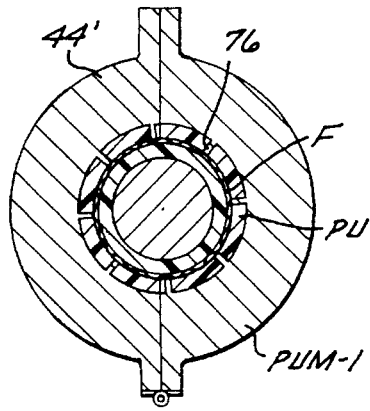
FIG. 18 is horizontal sectional view taken on line 18—18 of FIG. 17.
Figure 19:
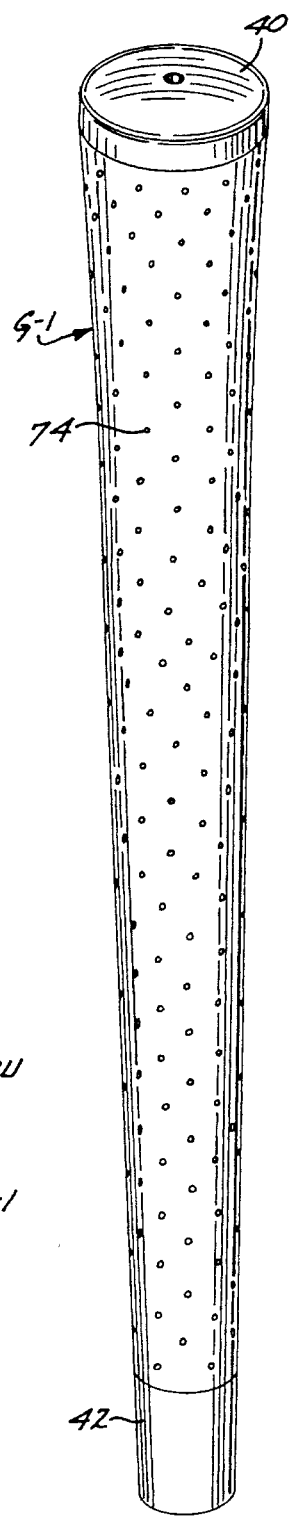
FIG. 19 is a perspective view showing a golf club grip made with the mold of FIGS. 17 and 18.

Referring now to FIGS. 17, 18 and 19, there is shown a second form of golf club grip G-1 embodying the present invention wherein the polyurethane layer PU is provided with perforations 74 through the thickness of such layer. Perforations 74 channel dampness into the porous felt layer F. It has been found that when the grip G-1 is grasped by a golfer with the palm and fingers of the golfers hands covering the perforations 74, air is first pumped inwardly through these perforations and then into the felt layer F when the golfer relaxes his grasp and uncovers the perforations air will be sucked back through the perforations to achieve "breathing" of the air by the grip. The felt layer permits movement of the air inwardly and outwardly relative to the polyurethane layer because of the porosity of such felt layer. The interchange of air as it is pumped through the grip serves to evaporate dampness which can accumulate on the exterior of the surface of the polyurethane layer PU when the golfer is playing trader rainy conditions. Such interchange of air will also serve to evaporate perspiration which would normally accumulate on the exterior surface of the polyurethane layer. Accordingly, a golfer maintains a better hold on the golf club grip than can be achieved with prior an grips and his control over the golf club is enhanced even under adverse conditions.

Referring to FIGS. 17 and 18, the perforated golf club grip G-1 is formed in a split mold PUM-1 generally similar to the aforedescribed mold PUM and like pans bear primed reference numerals in these figures. The difference between molds PUM and PUM-1 resides in the provision of radially inwardly extending pins 76 on the housing halves 44', such pins extending into the confines of the polyurethane receiving cavity so as to form the perforations 74 when polyurethane is molded within cavity.

Referring now to FIGS. 20, 21 and 22, there is shown a third form of golf club grip G-3 embodying the present invention. Golf club grip G-3 is generally similar to the aforedescribed grips except that the exterior surface of the polyurethane layer PUL is provided with a plurality of dimples 78 over its surface. Such dimples reduce slippage of a golfers hand on the grip G-3 by increasing the frictional contact of the golfers hand relative to the grip. If desired, the radially inner portion of the dimples 78 can intersect radially extending perforations (not shown). Such dimple perforation combination provides perspiration and dampness channeling from the polyurethane layer PUL to the felt layer F. Golf club grip G-3 may be formed in a mold PUM-2 similar to the aforedescribed molds, the dimples 78 being formed by radially inwardly extending arcuate knobs 80 on the housing 81 which extend into the polyurethane receiving cavity.

Referring now to FIGS. 23, 24 and 25, there is shown a golf club grip G-4 embodying the present invention wherein spirally configured protrusions 82 are formed on the exterior surface of the polyurethane layer PU. Such protrusions serve to reduce slippage of a golfers hand on the grip G-4 by increasing the frictional contact of the golfers hand relative to the grip. Golf club grip G-4 may be formed in a mold PUM-3 similar to the aforedescribed molds, with the spiral protrusions being formed by a radially outwardly extending groove 84 provided on the inwardly facing surfaces of the mold housing 85.

Figure 26:
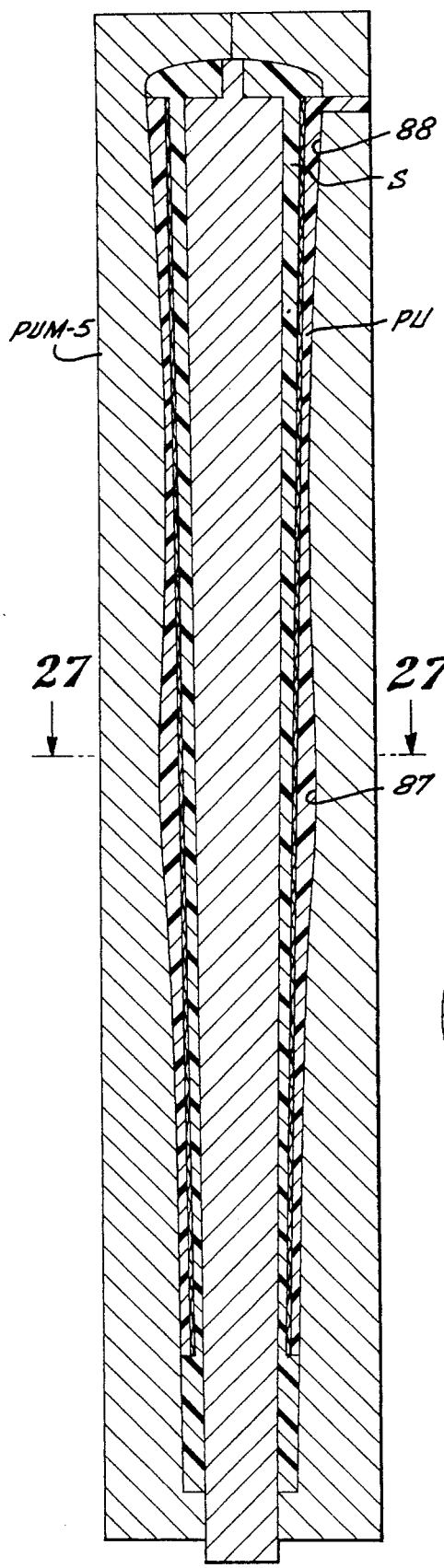
FIG. 26 is a central vertical sectional view of a polyurethane receiving mold utilized to form a golf club grip wherein the mid portion thereof is radially expanded to enhance the golfers grip on a golf club.
Figure 27:
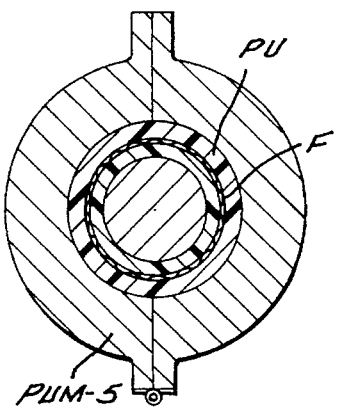
FIG. 27 is a horizontal sectional view taken along line 27—27 of FIG. 26.
Figure 28:
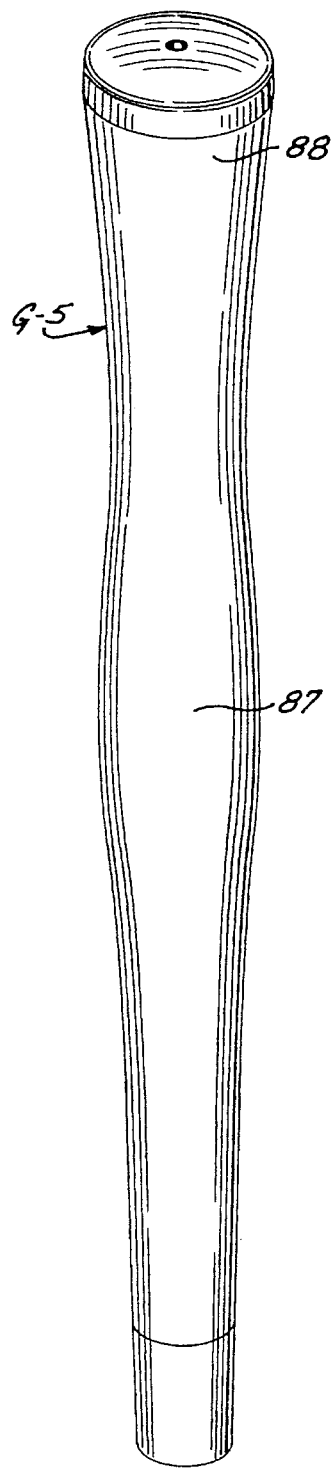
FIG. 28 is a perspective view showing a golf club grip made with the mold of FIGS. 26 and 27.

Referring now to FIGS. 26, 27 and 28, there is shown another form of golf club grip G-5 embodying the present invention. The configuration of golf club grip G-5 is based upon applicants discovery that some golfers can obtain optimum control of a golf club by utilizing a grip wherein the intermediate longitudinal portion thereof is radially expanded relative to the diameter of the upper and lower portions of the grip. Grip G-5 is formed in a mold PUM-5 similar to the aforedescribed molds, with the exception that the mold cavity extends radially outwardly at its mid-portion as indicated at 87, as well as at its upper portion as indicated at 88. The configuration of golf club grip G-5 permits the palms of a golfers hands (not shown) to grasp the grip with pads of his hands to apply maximum gripping force at the intermediate portion of the grip. At the same time, the golfers fingers can engage the grip at the reduced lower diameter portion thereof to facilitate relaxation of the golfers fingers on the grip thereby enhancing the golfers ability to achieve a controlled swing.

Referring to FIGS. 29, 30 and 31, there is shown a form of grip GP embodying the present invention adapted for use on a golf club putter (not shown). Golf club grip GP is shown provided with a flat surface 89 and an annular surface 90 disposed oppositely to the flat surface 89 with the outer portion of the flat and annular surfaces being connected by straight side surfaces 91 and 92. This configuration has proved to provide greatly increased accuracy when the grip is secured to a putter. Grip GP is formed in a polyurethane receiving mold PUM-6 similar to the aforedescribed molds, with the exception that the polyurethane receiving cavity is configured as shown in FIGS. 29 and 30 to define the desired grip profile.

Golf club grips embodying the present invention provide a firm grasp of the grip by the golfer, even when such grip is dampened, as for example, when playing under rainy conditions or by contact with perspiration formed on the golfer's hands. The grip absorbs more vibration and shock than conventional grips and thereby reduces hand fatigue. Accordingly, the golfer can maintain a better hold on the grip than with conventional grips and can thereby maintain better control of his golf swing. Such control is enhanced by the tackiness inherent to the polyurethane layer of the grip. Also, golf club grips embodying the present invention enhance the player's feel and control during a swing by eliminating the need to wear a glove which protects against skin abrasion. The grip of the present invention is lighter in weight than conventional grips. Accordingly, more weight is distributed to the club head thereby increasing club head speed without increasing the weight of the golf clubs. The aforedescribed golf club grips embodying the present invention can provide a grip having a longitudinal and/or horizontal profile which may be tailored to the size and shape of an individual golfer's hands so as to further enhance control of the golfer over a golf club.

Various modifications and changes may be made with respect to the foregoing detailed description without departing from the spirit of the claimed invention.

I claim:

1. An integral golf club grip adapted for application over a golf club shaft, such grip comprising:

a resilient, rubber-like sleeve adapted for snug application over the grip-receiving area of a golf club shaft;

a textile sleeve bonded to the exterior of the rubber-like sleeve;

a polyurethane sleeve bonded onto the exterior surface of the textile sleeve; and wherein the textile sleeve is of porous construction and the polyurethane sleeve is formed with closed pores that extend transversely to the longitudinal axis of the polyurethane sleeve.

2. An integral golf club grip as set forth in claim 1, wherein slip-inhibiting patterns are formed on the exterior surface of the polyurethane sleeve.

3. An integral golf club grip as set forth in claim 1, wherein the golf club is a putter and wherein the grip is provided with a flat surface and an annular surface disposed oppositively to said flat surface, with the outer portion of the flat and annular surfaces being connected by straight side surfaces.

4. An integral golf club grip as set forth in claim 1, wherein the rubber-like sleeve is formed with a cap at its upper end and a guide cylinder at its lower end of greater diameter than the portion of the sleeve immediately above said guide cylinder that rigidifies the lower end of the grip when it is applied to a golf club shaft.

5. An integral golf club grip as set forth in claim 1, wherein the polyurethane layer is formed with perforations which extend from the exterior of the polyurethane sleeve to the textile sleeve to channel dampness into the textile sleeve and effect an interchange of air between the sleeves when the grip is compressed during use.

6. An integral golf club grip as set forth in claim 4, wherein slip-inhibiting patterns are formed on the exterior surface of the polyurethane sleeve.

7. An integral golf club grip as set forth in claim 4, wherein the polyurethane layer is formed with perforations which extend from the exterior of the polyurethane sleeve to the textile sleeve to channel dampness into the textile sleeve and effect an interchange of air between the sleeves when the grip is compressed during use.

8. An integral golf club grip adapted for application over a golf club shaft, said grip comprising:

a resilient, rubber-like sleeve adapted for snug application and adherence to a golf club shaft, said robber-like sleeve being formed with an apertured cap at its upper end and a guide cylinder at its lower end, the guide cylinder being of greater diameter than the portion of the robber-like sleeve immediately above said sleeve;

a felt sleeve bonded to the exterior surface of the rubber-like sleeve between the underside of said cap and the top of said guide cylinder;

a polyurethane sleeve bonded onto the exterior surface of the felt sleeve so as to provide a smooth longitudinal contour for the exterior of the rubber-like sleeve and polyurethane sleeve;

wherein the felt sleeve is of porous construction and the polyurethane sleeve is formed with closed pores that extend transversely to the longitudinal axis of the polyurethane sleeve;

wherein the polyurethane layer is formed with perforations which extend from the exterior of the polyurethane sleeve to the felt sleeve to channel dampness into the felt sleeve and effect an interchange of air between the sleeves when the grip is compressed during use;

wherein slip-inhibiting patterns ere formed on the exterior surface of the polyurethane layer; and with said guide cylinder rigidifying the lower end of the sleeves when the grip is applied to a golf club shaft.

* * * * *